United States Patent
Anumala et al.

(10) Patent No.: US 8,861,339 B2
(45) Date of Patent: *Oct. 14, 2014

(54) PACKET FORWARDING FUNCTION OF A MOBILITY SWITCH DEPLOYED AS ROUTED SMLT (RSMLT) NODE

(75) Inventors: Mohnish Anumala, Littleton, MA (US); Alexandros Moisiadis, Stow, MA (US); Shu Ching Shieh, Nashua, NH (US); Debin Zhang, Littleton, MA (US); Lawrence James DiBurro, Haverhill, MA (US)

(73) Assignee: Avaya Inc., Basking Ridge, NJ (US)

( * ) Notice: Subject to any disclaimer, the term of this patent is extended or adjusted under 35 U.S.C. 154(b) by 915 days.

This patent is subject to a terminal disclaimer.

(21) Appl. No.: 12/917,046

(22) Filed: Nov. 1, 2010

(65) Prior Publication Data

US 2012/0106523 A1    May 3, 2012

(51) Int. Cl.
| | |
|---|---|
| *G06F 11/00* | (2006.01) |
| *H04L 12/701* | (2013.01) |
| *H04L 12/46* | (2006.01) |
| *H04L 12/713* | (2013.01) |
| *H04W 40/24* | (2009.01) |
| *H04L 12/707* | (2013.01) |

(52) U.S. Cl.
CPC ............... *H04L 45/00* (2013.01); *H04L 45/586* (2013.01); *H04W 40/24* (2013.01); *H04L 45/24* (2013.01); *H04L 12/4641* (2013.01)

USPC ........................ 370/225; 370/338; 370/395.53

(58) Field of Classification Search
None
See application file for complete search history.

(56) References Cited

U.S. PATENT DOCUMENTS

| | | | |
|---|---|---|---|
| 8,446,818 B2 * | 5/2013 | Moisiadis et al. | 370/218 |
| 2005/0007951 A1 * | 1/2005 | Lapuh et al. | 370/225 |
| 2006/0007939 A1 * | 1/2006 | Elangovan | 370/395.53 |

* cited by examiner

*Primary Examiner* — Jae Y Lee
*Assistant Examiner* — Tito Pham
(74) *Attorney, Agent, or Firm* — Anderson Gorecki & Rouille LLP (57) ABSTRACT

A method, apparatus and computer program product for providing Routed Split Multi Link Trunking (RSMLT) for Wireless Local Area Network (WLAN) tunnels is presented. A first and second network switch learn data associated with each other, wherein the first network switch and the second network switch operate concurrently. The first network switch terminates a WLAN Tunnel. The data is synchronized between the first network switch and the second network switch, wherein the data includes MAC Addresses, Internet Protocol (IP) interface addresses, Virtual Local Area Network (VLAN) associations, WLAN tunnel assignments and Network switch Internet Protocol (IP) addresses. Load sharing of tunnel data packets is performed by the first and the second network switch. Tunnel control packets received by the second network switch are forwarded to the first network switch over an Inter Switch Trunk (IST).

16 Claims, 6 Drawing Sheets

PACKET FORWARDING FUNCTION OF A MOBILITY SWITCH DEPLOYED AS ROUTED SMLT (RSMLT) NODE

BACKGROUND

Data communication networks may include various computers, servers, nodes, routers, switches, hubs, proxies, and other devices coupled to and configured to pass data to one another. These devices are referred to herein as "network elements," and may provide a variety of network resources on a network. Data is communicated through data communication networks by passing protocol data units (such as packets, cells, frames, or segments) between the network elements over communication links on the network. A particular protocol data unit may be handled by multiple network elements and cross multiple communication links as it travels between its source and its destination over the network. Hosts such as computers, telephones, cellular telephones, Personal Digital Assistants, and other types of consumer electronics connect to and transmit/receive data over the communication network and, hence, are users of the communication services offered by the communication network.

Network switches (Access Points, Mobility Switches, Edge Switches and the like) are typically implemented to have a control plane that controls operation of the network element and a data plane that handles traffic flowing through the network. The data plane typically will have a collection of line cards having ports that connect to links on the network. Data is received at a particular port, switched within the data plane, and output at one or more other ports onto other links on the network. To enable the data to be handled quickly, the data plane is typically implemented in hardware so that all of the decisions as to how to handle the data are performed using hardware lookups, etc.

Over time, the manner in which network elements handle data has evolved. For example, two or more physical links may extend between a group of network elements and be used collectively as a multi-link trunk (MLT). When the links of an MLT are physically connected to two different network elements, the MLT is referred to as a Split Multi-Link Trunk (SMLT).

As noted above, depending on the manner in which the network elements are interconnected, there may be many ways for the network element to forward a frame/packet to enable the frame/packet to reach its destination. As used herein, the term "cluster" is used to refer to one or more nodes providing node-level resiliency at the network level. Logical connections between the cluster nodes are referred to herein as Inter-Switch Trunks (ISTs). ISTs may be physical links that extend from one network element to a neighboring network element in the cluster, or may be logical links that tunnel through one or more intermediate network elements within the cluster. The node that receives a packet will be referred to as a local node. All other nodes within the cluster are referred to as remote nodes with respect to the received packet.

Wireless Local Area Network (WLAN) split-plane requires data plane or packet forwarding function of the WLAN end devices (mobility units) traffic being handled by the routing switches in the wired network rather than tunneling all the WLAN traffic to centralized controllers. These switches are called mobility switches and they are capable of terminating tunnels initiated by the WLAN access point (AP) devices. They perform the packet forwarding function for the WLAN network.

A significant number of deployments have (routed) split multi-link trunking (SMLT/RSMLT) in the distribution and core layers. (R)SMLT provides redundancy and traffic load balancing of the routing switch nodes. Typical WLAN split plane deployment in a customer network will prefer the mobility switch function be performed by a routing switch in the distribution or core layers. This essentially requires interworking between WLAN split plane and RSMLT. WLAN split plane is a unique solution to converge the wired and wireless networks. In these converged networks, wired network resiliency capabilities should be extended to the WLAN networks.

SUMMARY

In a world where communications and permanent connectivity of devices to the Internet have become the norm, loss of connectivity and jitter are becoming unacceptable. This requires networks to provide as fast recovery as possible and as small traffic loss as can possibly be allowed. The Virtual Router Redundancy Protocol (VRRP) and its newer incarnation VRRPv3 provide a level of resiliency and recovery from loss which may be acceptable for small networks or applications that are not time critical. VRRPv3 does not address the special issues raised in the case of point to point tunnels like the ones created in a Wireless LAN Split-plane network architecture where additional protocol dependencies come into play.

The current "network overlay" model of integrating Wireless networks with the wired network infrastructure has drawbacks that are alleviated with a newer design called Wireless LAN Split-Plane architecture. In this architecture the basic data forwarding function is pulled out of the Wireless Switches and is incorporated into the existing Routing switches, thus minimizing the monetary cost and network management headaches for Enterprise networks. In such deployments, the Access Point device that performs the Wireless signaling to the Mobile units, is connected via a point-to-point tunnel to one member of a pair of Routing switches that form a Routed Split Multi-Link Trunking (RSMLT) system. RSMLT clusters are used traditionally in networks in order to provide resiliency, redundancy and fast traffic recovery when links are severed or a switch goes out of service.

Conventional mechanisms such as those explained above suffer from a variety of deficiencies. The conventional manner for providing load-sharing services is the VRRP protocol and its different incarnations. In the VRRP case configuration is required in order to perform load sharing. When a link is severed or when the VRRP master switch stops functioning, VRRP on the still active peer depends on timers per interface in order to perform the switch over, which overloads the system as the number of interfaces increases and the timers have short timeouts thus hindering the quick recovery.

It is therefore desirable to extend the RSMLT in order to provide load-sharing and resiliency services to networking topologies that include tunneling. None of the aforementioned cases deals with providing redundancy, load sharing, and quick recovery in the case of WLAN Split-plane Access Tunnels.

Embodiments of the invention significantly overcome such deficiencies and provide mechanisms and techniques that provide the capability to distribute packet forwarding operation of point to point tunnels between two peer nodes while maintaining the tunnel control function in one of the nodes. The presently disclosed method and apparatus for providing packet forwarding functions of a MS deployed as a RSMLT node distributes packet forwarding operation of a point to point tunnel between two peer nodes. The presently described method and apparatus for providing packet forwarding functions of a MS deployed as a RSMLT node also preserves external entity function by maintaining the tunnel control function in one of the nodes, and also provides resiliency for converged wired and wireless network In a particular embodiment of a method for providing packet forwarding of a mobility switch deployed as a RSMLT node, the method includes learning, by a first network switch, first data associated with a second network switch wherein the first network switch and the second network switch operate concurrently and wherein the first network switch terminates an Access Tunnel (AT). The method further includes learning, by the second network switch, second data associated with the first network switch. Additionally, the method includes synchronizing the first and second data between the first network switch and the second network switch, wherein the data includes MAC Addresses, Internet Protocol (IP) interface addresses and ARP records, Virtual Local Area Network (VLAN) associations, AT assignments and Access Point IP addresses. The method further includes load sharing tunnel data packets by the first network switch and the second network switch wherein when the second network switch receives tunnel data packets destined to the first network switch the second network switch acts as a tunnel endpoint and performs tunnel functions for the tunnel data packets, forwarding tunnel control packets received by the second network switch to the first network switch over an Inter Switch Trunk (IST).

Other embodiments include a computer readable medium having computer readable code thereon for packet forwarding of a mobility switch deployed as a RSMLT node. The computer readable medium includes instructions for learning, by a first network switch, first data associated with a second network switch wherein the first network switch and the second network switch operate concurrently and wherein the first network switch terminates an Access Tunnel (AT). The method further includes as learning, by the second network switch, second data associated with the first network switch. Additionally, the computer readable medium includes instructions for synchronizing the first and second data between the first network switch and the second network switch, wherein the data includes MAC Addresses, Internet Protocol (IP) interface addresses, Virtual Local Area Network (VLAN) associations, AT assignments and Access Point IP addresses. The computer readable medium further includes instructions for load sharing tunnel data packets by the first network switch and the second network switch wherein when the second network switch receives tunnel data packets destined to the first network switch the second network switch acts as a tunnel endpoint and performs tunnel functions for the tunnel data packets, forwarding tunnel control packets received by the second network switch to the first network switch over an Inter Switch Trunk (IST).

Still other embodiments include a computerized device (e.g., a network switch), configured to process all the method operations disclosed herein as embodiments of the invention. In such embodiments, the computerized device includes a memory system, a processor, communications interface in an interconnection mechanism connecting these components. The memory system is encoded with a process that provides packet forwarding of a mobility switch deployed as a RSMLT node as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing packet forwarding functions of a MS deployed as a RSMLT node as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A WLAN tunnel provides point to point connectivity. There are two types of WLAN tunnels. An Access Tunnel (AT) connects an Access Point (AP) to a Mobility Switch (MS). A Mobility Tunnel (MT) connects a MS to another MS. RSMLT peers provide redundancy for all network traffic. When the RSMLT switch provides mobility switching function, then there is no resiliency for the WLAN tunnel traffic in the event of failure as its peer isn't part of the point-to-point tunnel. To overcome this limitation, the present invention extends the RSMLT resiliency capability to WLAN tunnels.

RSMLT support for WLAN tunnels is achieved by extending Inter-Switch Trunk (IST) protocol to synchronize tunnel information relating to ATs and MTs between RSMLT peers. The Mobility VLAN Mgmt Protocol (MVMP) establishes point to point tunnels between AP/MS to MS. A mechanism is provided wherein both RSMLT peers are aware of each others WLAN tunnels.

RSMLT support for WLAN tunnels further requires implementing tunnel end point function for local and peer's ATs and MTs. When an RSMLT node is aware of its peer's WLAN tunnels, it implements tunnel end point functions. This includes packet classification for the tunnel, encapsulation and de-capsulation of the VLAN traffic with tunnel header. RSMLT support for WLAN tunnels also requires implementing packet forwarding functions for inner packet in the tunnel. For inbound tunnel traffic, after tunnel header processing and decapsulation, the RSMLT node implements packet forwarding function. Packet forwarding includes association to VLAN server and routing/switching.

RSMLT support for WLAN tunnels further requires synchronizing the VLAN servers between the peers. Local VLAN servers information between the peers is synchronized. A peer will create a remote VLAN in RSMLT node corresponding to peer's local VLAN server when WLAN tunnel is a member and local VLAN server instance doesn't exist. The RSMLT node creates a remote VLAN when its peer creates remote VLAN.

RSMLT support for WLAN tunnels further requires recognizing the Mobility VLAN Mgmt Protocol (MVMP) traffic (tunnel control traffic) and steering it to the proper peer. Even though tunnel forwarding operation is distributed between RSMLT peers, tunnel control operation isn't, therefore it is important that the RSMLT node recognize and differentiate between control traffic for this node to peer's control traffic. The peer needs to steer the traffic appropriately. Peer's traffic should be sent over the IST.

Figure 1:
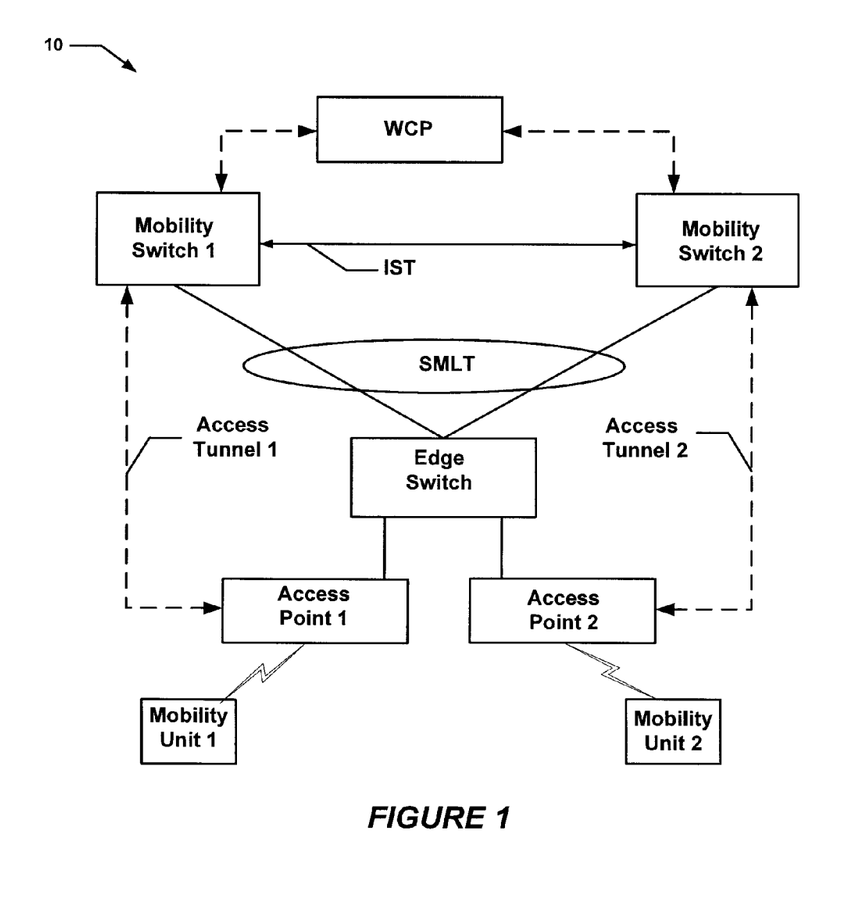
FIG. 1 depicts a block diagram of a network environment providing RSMLT for access tunnels in accordance with embodiments of the invention.

Referring now to FIG. 1, a typical triangle RSMLT topology 10 in the distribution layer is shown. Mobility Units (MUs) such as laptop computers, Personal Digital Assitants (PDAs), cellular telephones or other handheld devices connect to APs. Here MU1 is in communication with AP1 and MU2 is in communication with AP2. Each AP (AP1 and AP2) is in communication with an edge switch which forms part of a SMLT configuration with MS1 and MS2. An IST exists between MS1 and MS2.

RSMLT nodes (MS1 & MS2) are implementing the mobility switching function as well. Access points (AP1 & AP2) are implementing the wireless edge functionality. After coming up and establishing communication with the WLAN controller, an AP will choose one of the MSs to form an access tunnel with. In this case, AP1 picked MS1 (via AT1) and AP2 picked MS2 (via AT2). Access tunnels (AT1 & AT2) are created. By way of the IST, tunnel information between the RSMLT peers (MS1 and MS2) is synchronized. Both RSMLT peers (MS1, MS2) are aware of the access tunnels (AT1, AT2) and capable of forwarding traffic of its peer's tunnel traffic.

Figure 2:
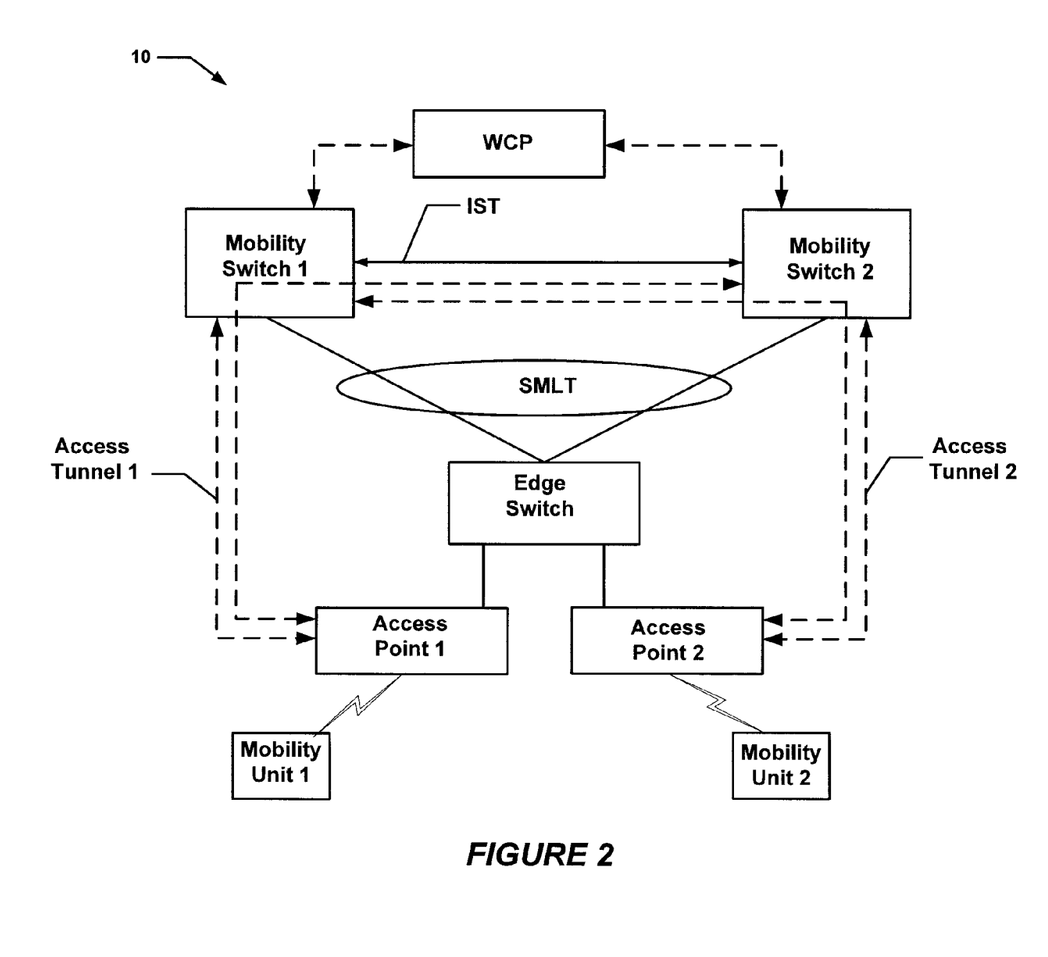
FIG. 2 depicts a block diagram of a second network environment providing RSMLT for access tunnels in accordance with embodiments of the invention.

Referring now to FIG. 2, the same network environment 10 of FIG. 1 is shown, and further includes the path for Mobility VLAN management protocol (MVMP) packets. MVMP traffic (also referred to herein a tunnel control data) is recognized and steered to the appropriate RSMLT node performing mobility switching function. Traffic forwarded by AP1 which is recognized as MVMP data for MS2 is forwarded to MS1 and then forwarded to MS2 via the IST where the MVMP data is acted upon. Similarly, for MVMP data forwarded by AP2 which is destined for MS1, the MVMP data is sent to MS2 and is forwarded across the IST to MS1 where the MVMP data is acted upon.

An access tunnel proceeds from the access point to the mobility switch. There can be a situation where the user can migrate. In this case, mobility connection is maintained by use of mobility tunnels. The user can migrate to a new access point but the switch connected may or may not be able to handle that session. A mobility tunnel is used to send the traffic back to the original device that is handling the traffic. Mobility switches form a mesh of mobility tunnels. In this way the traffic can go to anybody. This allows a user to roam for example between buildings without terminating a session. If a user roams from one building to another the user creates a proxy of the VLAN that he is part of with the new mobility switch he's communicating with.

Mobility tunnel equivalency is needed to accommodate situation where to MS RSMLT peers serving mobility VLANs established MTs to the two different local VLAN servers. This functionality is needed when the local VLAN is served by two RSMLT peers and resiliency can be achieved over the core network. There are rules conforming equivalency for mobility tunnels. The VLAN is symmetric and synchronized in such a way that one becomes the remote VLAN and the other becomes the local VLAN traffic.

MT equivalency means if one of the peers goes away the other one assumes its role. If tunnels are equivalents then if one tunnel goes down the peer knows he can use the other tunnel to forward data. Each tunnel can optionally use same destination encapsulation.

Figure 3:
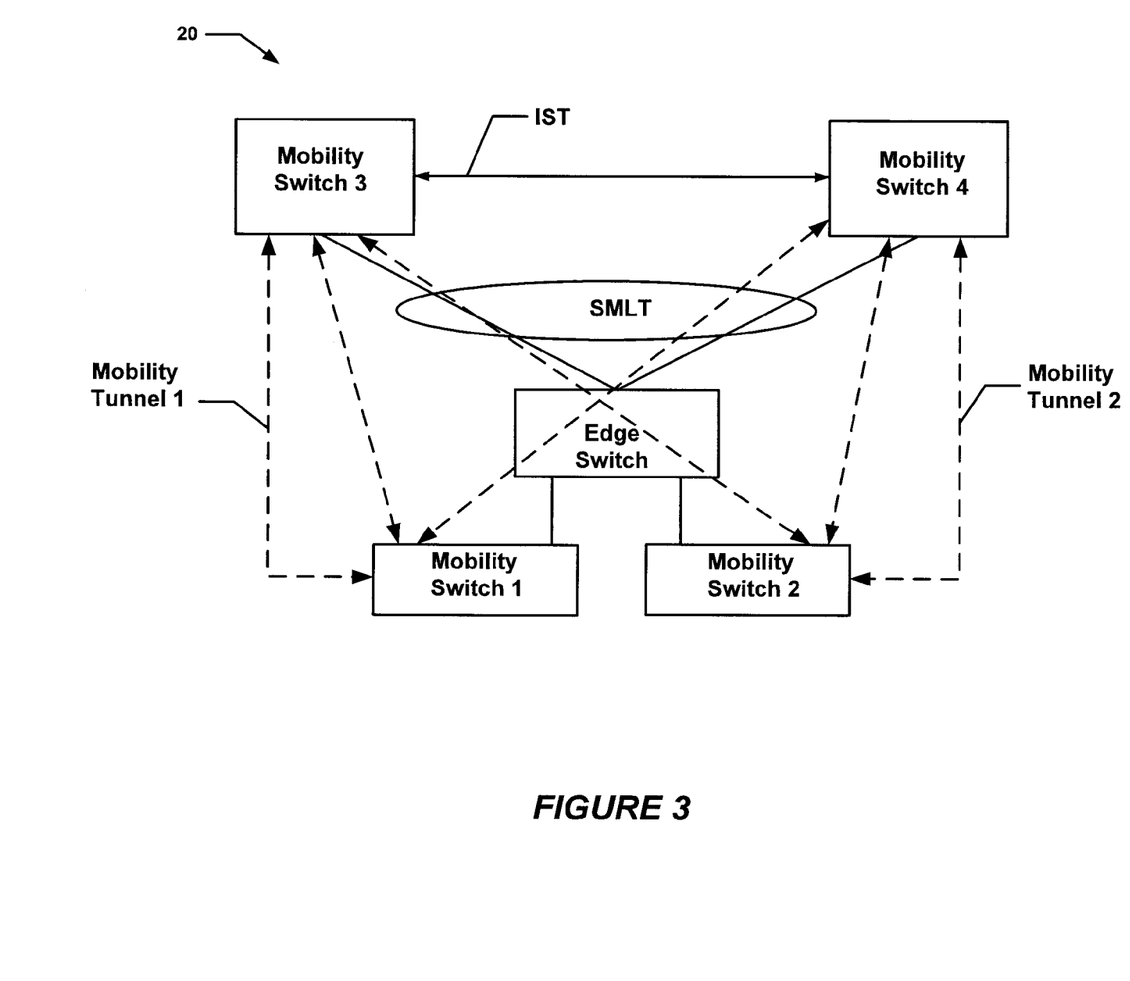
FIG. 3 depicts a block diagram of a network environment providing RSMLT for mobility tunnels in accordance with embodiments of the invention.

FIG. 3 shows the mobility tunnels formed between RSMLT peers and other mobility switches in the network 20. RSMLT support for WLAN tunnels further requires MT equivalency between RSMLT peers. Unlike access tunnel, there is a need to establish mobility tunnel equivalency. This is needed to accommodate the situation where two MS RSMLT peers serving remote (mobility) VLAN and established MTs with two different local VLAN servers. This functionality is needed when local VLAN is served by two RSMLT peers and resiliency can be achieved over the core network.

Here, MS1 and MS2 are in communication with an edge switch which forms part of a SMLT configuration with MS3 and MS4. An IST exists between MS3 and MS4. RSMLT nodes (MS3 & MS4) are implementing the mobility switching function as well. In this case, MS1 picked MS3 (via MT1) and MS2 picked MS4 (via MT2). By way of the IST, tunnel information between the RSMLT peers (MS3 and MS4) is synchronized. Both RSMLT peers (MS3, MS3) are aware of the mobility tunnels (MT1, MT2) and capable of forwarding traffic of its peer's tunnel traffic. MVMP tunnels exist in a mesh configuration between MS1, MS2, MS3 and MS4.

Figure 4:
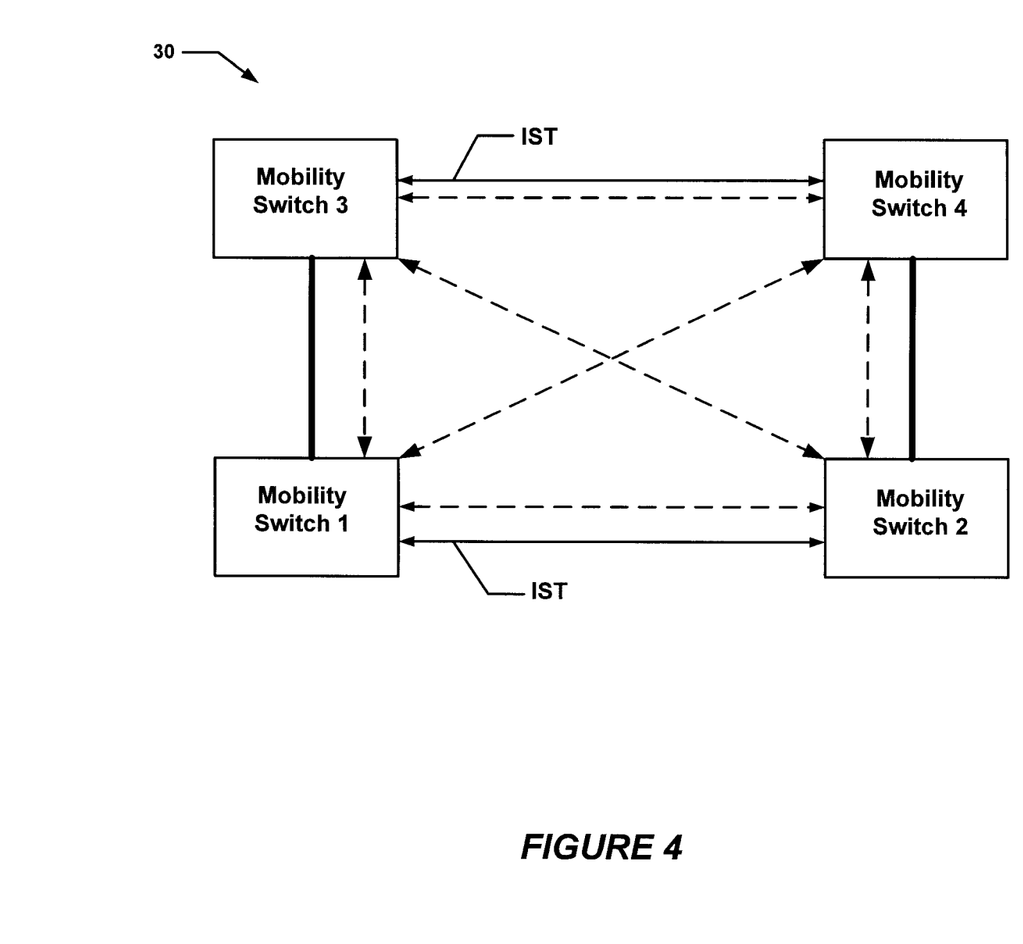
FIG. 4 depicts a block diagram of a second network environment providing RSMLT for mobility tunnels in accordance with embodiments of the invention.

FIG. 4 shows the mobility tunnels formed between RSMLT switches in a square configuration. MS1 shares an IST with MS2 and MS3 shares an IST with MS4. The MVMP tunnels are in a mesh configuration between the MSs. RSMLT nodes (MS3 & MS4) are implementing the mobility switching function as well. In this case, MS1 picked MS3 (via MT1) and MS2 picked MS4 (via MT2). By way of the IST, tunnel information between the RSMLT peers (MS3 and MS4) is synchronized. Both RSMLT peers (MS3, MS3) are aware of the mobility tunnels (MT1, MT2) and capable of forwarding traffic of its peer's tunnel traffic. MVMP tunnels exist in a mesh configuration between MS1, MS2, MS3 and MS4.

Mobility tunnel equivalency (in VLAN scope) means a single packet header encapsulation for all MT equivalents; a primary/local MT (LPORT) per VLAN; ingress data is classified to primary MT; and during IST FDB synchronization, LPORT/MT is remapped based on equivalency. Equivalency is only for data traffic, and the data plane will be able to treat CAPWAP control traffic as non-equivalent. A mobility rule for local and remote VLANs is MTs with the same remote destination are equivalent. For example, MT1 exists between MS1 and MS3, and MT2 exists between MS4 and MS1, then MT1 is equivalent to MT2. A mobility rule for remote VLANs is when a remote VLAN exists on both IST peers, then associated MTs are equivalent. For example, MT7 exists between MS1 and MS3, and MT8 exists between MS2 and MS4, then MT7 is equivalent to MT8.

Figure 5A:
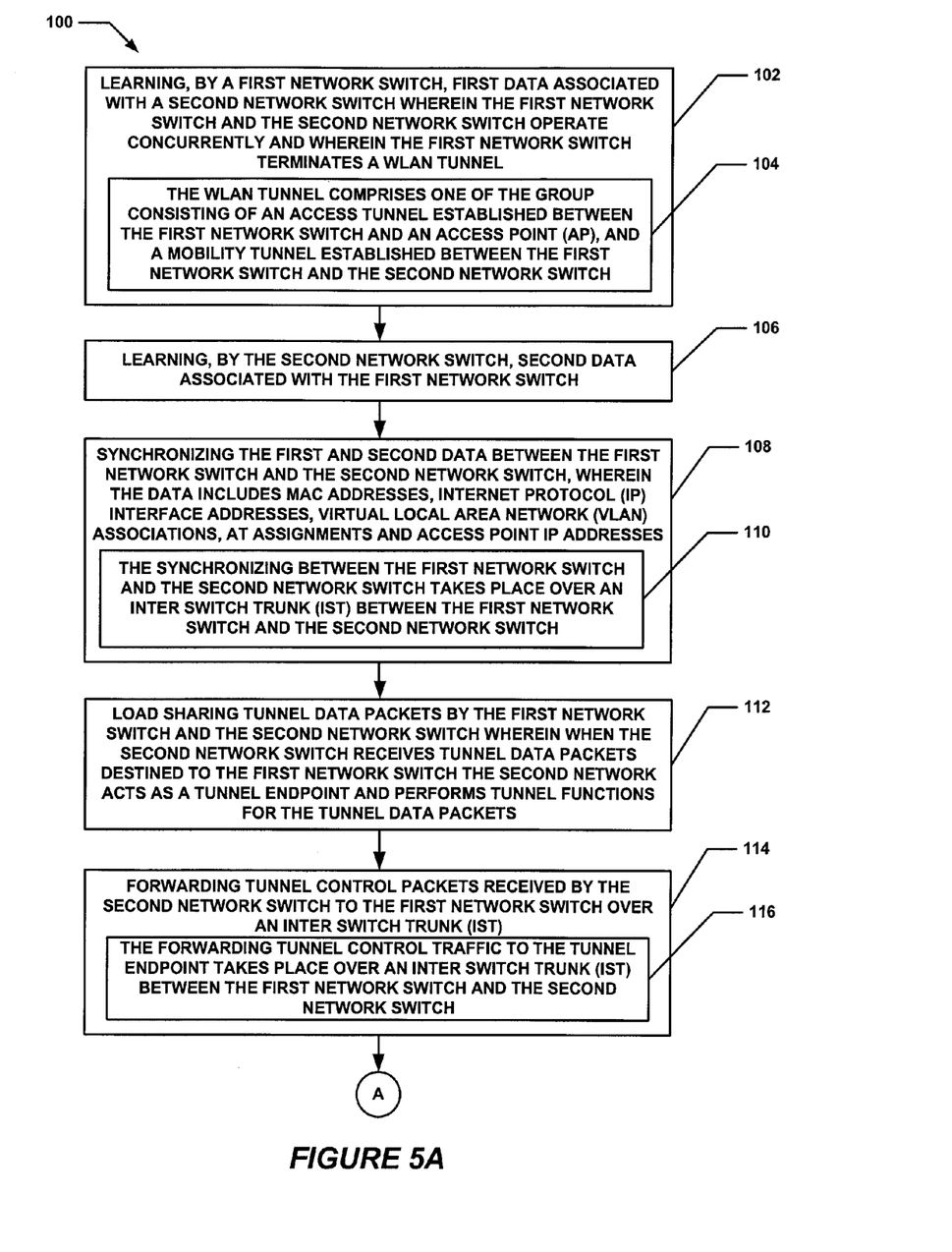
FIGS. 5A and 5B depict a flow diagram of a particular embodiment of a method for packet forwarding of a mobility switch deployed as a RSMLT node in accordance with embodiments of the invention.
Figure 5B:
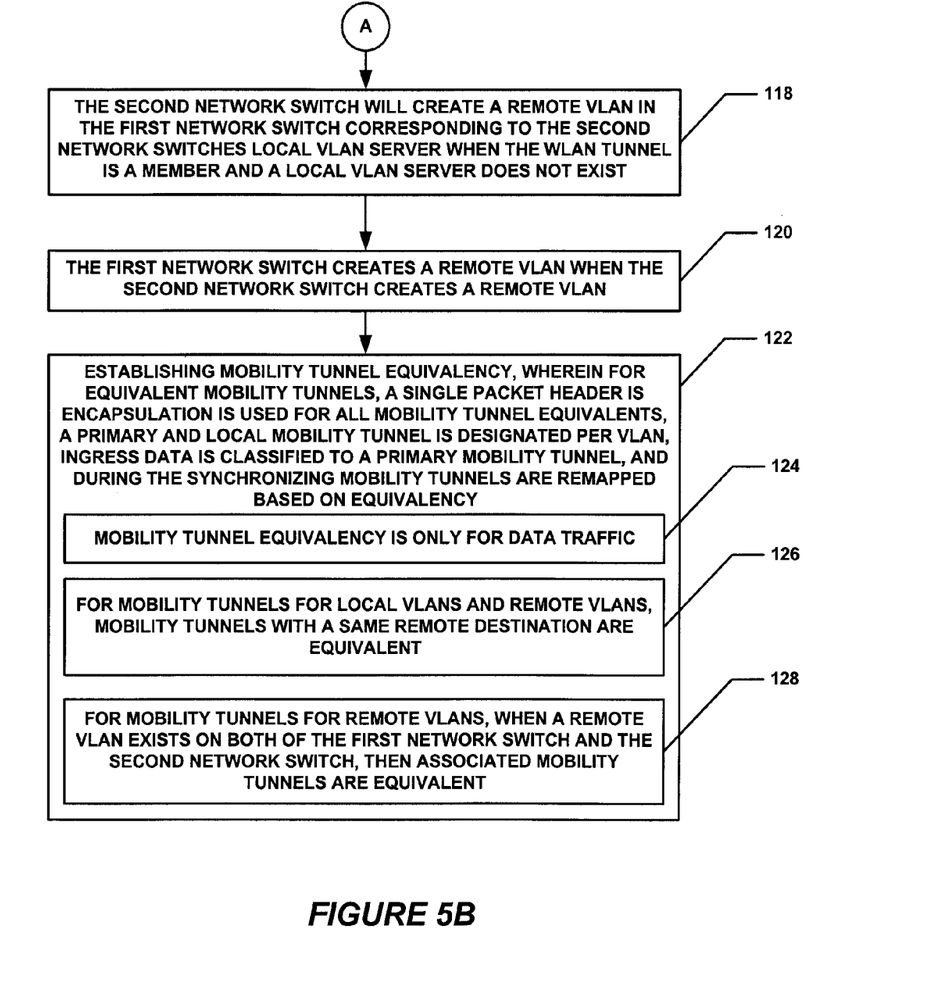

FIGS. 5A and 5B depict a flow diagram for a particular method for performing Routed Split Multi-Link Trunking Resiliency for Wireless Local Area Network split-plane environments in accordance with embodiments of the invention. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 5A and 5B, a particular embodiment of a method 100 for performing Routed Split Multi-Link Trunking Resiliency for Wireless Local Area Network split-plane environments is shown. Method 100 begins with processing block 102 which discloses learning, by a first network switch, first data associated with a second network switch, wherein the first network switch and the second network switch operate concurrently and wherein the first network switch terminates an Access Tunnel (AT).

Processing block 104 recites learning, by the second network switch, second data associated with the first network switch.

Processing block 106 discloses synchronizing the first and second data between the first network switch and the second network switch, wherein the data includes MAC Addresses, Internet Protocol (IP) interface addresses, Virtual Local Area Network (VLAN) associations, AT assignments and Access Point IP addresses.

Processing block 108 states load sharing tunnel data packets by the first network switch and the second network switch wherein when the second network switch receives tunnel data packets destined to the first network switch the second network acts as a tunnel endpoint and performs tunnel functions for the tunnel data packets.

Processing block 110 recites forwarding tunnel control packets received by the second network switch to the first network switch over the IST.

Processing continues with processing block 112 which discloses detecting a failure relating to the first network switch. As shown in processing block 14, detecting a failure relating to the first network switch comprises detecting one of the group consisting of a link failure and a switch failure. Alternately, as shown in processing block 116 detecting a failure relating to the first network switch comprises determining that the first network switch is not responding to tunnel control packets.

Processing block 118 states performing recovery actions upon the detecting a failure. As shown in processing block 120, the recovery actions include recognizing addresses and tunnels associated with the first network switch as belonging to the second network switch and handling the data packets destined for the first network switch by the second network switch for a predetermined amount of time. As further shown in processing block 122, the recovery actions further include establishing a new AT with the second network switch, and, as shown in processing block 124, forwarding packets destined for the first network switch via the new AT to the second network switch.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method for providing Routed Split Multi Link Trunking (RSMLT) for Wireless Local Area Network (WLAN) tunnels, in which a computer system performs operations comprising:
   learning, by a first network switch, first data associated with a second network switch wherein said first network switch and said second network switch operate concurrently and wherein said first network switch terminates an WLAN Tunnel;
   learning, by said second network switch, second data associated with said first network switch;
   synchronizing said first and second data between said first network switch and said second network switch, wherein said data includes MAC Addresses, Internet Protocol (IP) interface addresses, Virtual Local Area Network (VLAN) associations, WLAN tunnel assignments and Network switch Internet Protocol (IP) addresses; and
   load sharing tunnel data packets by said first network switch and said second network switch wherein when said second network switch receives tunnel data packets destined to said first network switch said second network acts as a tunnel endpoint and performs tunnel functions for said tunnel data packets;
   forwarding tunnel control packets received by said second network switch to said first network switch over an Inter Switch Trunk (IST); and
   establishing mobility tunnel equivalency, wherein for equivalent mobility tunnels, a single packet header encapsulation is used for all mobility tunnel equivalents, a primary and local mobility tunnel is designated per VLAN, ingress data is classified to a primary mobility tunnel, and during said synchronizing mobility tunnels are remapped based on equivalency and wherein, for mobility tunnels for local VLANs and remote VLANs, mobility tunnels with a same remote destination are equivalent.

2. The method of claim 1 wherein said WLAN tunnel comprises one of the group consisting of an access tunnel established between said first network switch and an Access Point (AP), and a mobility tunnel established between said first network switch and said second network switch.

3. The method of claim 1 wherein said synchronizing between said first network switch and said second network switch takes place over an Inter Switch Trunk (IST) between said first network switch and said second network switch.

4. The method of claim 1 wherein said forwarding tunnel control traffic to the tunnel endpoint by either of said first network switch and said second network switch takes place over an Inter Switch Trunk (IST) between said first network switch and said second network switch.

5. The method of claim 1 wherein said second network switch will create a remote VLAN in said first network switch corresponding to said second network switches local VLAN server when said WLAN tunnel is a member and a local VLAN server does not exist.

6. The method of claim 1 wherein said first network switch creates a remote VLAN when said second network switch creates a remote VLAN.

7. The method of claim 1 wherein mobility tunnel equivalency is only for data traffic.

8. The method of claim 1 wherein, for mobility tunnels for remote VLANS, when a remote VLAN exists on both of said first network switch and said second network switch, then associated mobility tunnels are equivalent.

9. A network switch comprising:
a memory;
a processor;
a communications interface;
an interconnection mechanism coupling the memory, the processor and the communications interface; and
wherein the memory is encoded with an application providing routed split multi-link trunking resiliency for wireless local area network tunnels, that when performed on the processor, provides a process for processing information, the process causing the network switch to perform the operations of:
learning first data associated with a peer network switch, wherein said first data includes MAC Addresses, Internet Protocol (IP) interface addresses, Virtual Local Area Network (VLAN) associations, AT assignments and Access Point IP addresses, wherein said network switch and said peer network switch operate concurrently and wherein said network switch terminates an Wireless Local Area Network (WLAN) Tunnel;
synchronizing said first data and second data associated with said network switch;
load sharing tunnel data packets wherein when said network switch receives tunnel data packets destined to said peer network switch said network switch acts as a tunnel endpoint and performs tunnel functions for said tunnel data packets;
forwarding tunnel control packets received by said network switch to said peer network switch over an Inter Switch Trunk (IST); and
establishing mobility tunnel equivalency, wherein for equivalent mobility tunnels, a single packet header encapsulation is used for all mobility tunnel equivalents, a primary and local mobility tunnel is designated per VLAN, ingress data is classified to a primary mobility tunnel, and during said synchronizing mobility tunnels are remapped based on equivalency and wherein, for mobility tunnels for local VLANs and remote VLANs, mobility tunnels with a same remote destination are equivalent.

10. The network switch of claim 9 wherein said WLAN tunnel comprises one of the group consisting of an access tunnel established between said network switch and an Access Point (AP), and a mobility tunnel established between said network switch and said peer network switch.

11. The network switch of claim 9 wherein said synchronizing between said network switch and said peer network switch takes place over an Inter Switch Trunk (IST) between said network switch and said peer network switch.

12. The network switch of claim 9 wherein said forwarding tunnel control traffic to the tunnel endpoint by either of said network switch and said peer network switch takes place over an Inter Switch Trunk (IST) between said network switch and said peer network switch.

13. The network switch of claim 9 wherein said peer network switch will create a remote VLAN in said network switch corresponding to said peer network switches local VLAN server when said WLAN tunnel is a member and a local VLAN server does not exist.

14. The network switch of claim 9 wherein said network switch creates a remote VLAN when said peer network switch creates a remote VLAN.

15. The network switch of claim 9 wherein mobility tunnel equivalency is only for data traffic.

16. The network switch of claim 9 wherein, for mobility tunnels for remote VLANS, when a remote VLAN exists on both of said network switch and said peer network switch, then associated mobility tunnels are equivalent.

* * * * *